United States Patent
Huang

(10) Patent No.: US 10,331,393 B2
(45) Date of Patent: Jun. 25, 2019

(54) VEHICLE-MOUNTED TERMINAL AND METHOD FOR OBTAINING RESOLUTION OF A SCREEN OF A HANDHELD TERMINAL

(71) Applicant: AutoChips Inc., Hefei, Anhui Province (CN)

(72) Inventor: Xiaozhou Huang, Hefei (CN)

(73) Assignee: AUTOCHIPS INC., Hefei, Anhui Province (CN)

(*) Notice: Subject to any disclaimer, the term of this patent is extended or adjusted under 35 U.S.C. 154(b) by 498 days.

(21) Appl. No.: 14/983,531

(22) Filed: Dec. 29, 2015

(65) Prior Publication Data

US 2016/0188275 A1    Jun. 30, 2016

(30) Foreign Application Priority Data

Dec. 29, 2014    (CN) .......................... 2014 1 0837698

(51) Int. Cl.
   *G06F 3/14*        (2006.01)
   *G06F 3/0488*      (2013.01)
   (Continued)

(52) U.S. Cl.
   CPC ............ *G06F 3/1423* (2013.01); *G06F 3/038* (2013.01); *G06F 3/0416* (2013.01);
   (Continued)

(58) Field of Classification Search
   CPC .................................................... G06F 3/1423
   (Continued)

(56) References Cited

U.S. PATENT DOCUMENTS 8,806,074 B2 *   8/2014   Ichieda ................. G06F 3/0383
                                                       345/156
9,423,871 B2 *   8/2016   Sukumar ................. G06F 3/013
                          (Continued)

FOREIGN PATENT DOCUMENTS

CN    101763234 A    6/2010
CN    103226453 A    7/2013
(Continued)

OTHER PUBLICATIONS

Christen, Martin. "Clockworkcoders Tutorial: Vertex Attributes", Khronos Group, Jan. 2007, four pages.*

*Primary Examiner* — William D Titcomb
(74) *Attorney, Agent, or Firm* — Cheng-Ju Chiang

(57) ABSTRACT

A vehicle-mounted terminal and a method for obtaining a resolution of a screen of a handheld terminal are disclosed. The method includes establishing a connection between a handheld terminal having a second screen and a vehicle-mounted terminal having a first screen, mapping a display of the second screen onto the first screen, obtaining a first coordinate difference between two coordinate points on the second screen and a second coordinate difference between two mapped points on the first screen that correspond to the two coordinate points respectively, and obtaining a resolution of the second screen using the relationship that a ratio of the first coordinate difference to the second coordinate difference is equal to a ratio of a mapped resolution of the second screen mapped onto the first screen to the resolution of the second screen, wherein the mapped resolution of the second screen mapped onto the first screen is a first resolution and the resolution of the second screen is a second resolution.

4 Claims, 4 Drawing Sheets

(51) Int. Cl.
*G06F 3/038* (2013.01)
*G06F 3/041* (2006.01)

(52) U.S. Cl.
CPC .... *G06F 3/0488* (2013.01); *G06F 2203/0383* (2013.01); *G09G 2340/0407* (2013.01); *G09G 2370/16* (2013.01); *G09G 2380/10* (2013.01)

(58) Field of Classification Search
USPC .......................................................... 715/761
See application file for complete search history.

(56) References Cited

U.S. PATENT DOCUMENTS

| | | | | |
|---|---|---|---|---|
| 9,715,719 | B2 * | 7/2017 | Nakai | G09G 3/3406 |
| 2005/0223335 | A1 * | 10/2005 | Ichikawa | G06F 3/0481 |
| | | | | 715/801 |
| 2008/0225008 | A1 * | 9/2008 | Madonna | G06F 3/0488 |
| | | | | 345/173 |
| 2010/0273533 | A1 * | 10/2010 | Cho | G06F 3/04886 |
| | | | | 455/566 |
| 2011/0201373 | A1 * | 8/2011 | Suzuki | H04W 4/08 |
| | | | | 455/517 |
| 2012/0032783 | A1 * | 2/2012 | Ahn | G06F 3/1423 |
| | | | | 340/6.1 |
| 2012/0274656 | A1 * | 11/2012 | Kang | G06F 1/1632 |
| | | | | 345/619 |
| 2013/0176216 | A1 | 7/2013 | Ichieda | |
| 2013/0179599 | A1 * | 7/2013 | Ichieda | G06F 3/0383 |
| | | | | 710/8 |
| 2013/0328878 | A1 * | 12/2013 | Stahl | G06F 3/1431 |
| | | | | 345/428 |
| 2014/0104137 | A1 * | 4/2014 | Brown | G06F 3/1423 |
| | | | | 345/1.1 |
| 2014/0162623 | A1 * | 6/2014 | Nagai | H04M 1/7253 |
| | | | | 455/419 |
| 2014/0191960 | A1 * | 7/2014 | Jeong | G06F 3/033 |
| | | | | 345/157 |
| 2014/0359493 | A1 * | 12/2014 | Hong | G06F 3/1454 |
| | | | | 715/761 |
| 2015/0012826 | A1 * | 1/2015 | Tengstrand | G06F 3/04842 |
| | | | | 715/717 |
| 2015/0042559 | A1 * | 2/2015 | Li | G06F 3/1438 |
| | | | | 345/156 |
| 2015/0154728 | A1 * | 6/2015 | Nara | G06F 3/0488 |
| | | | | 345/157 |
| 2015/0200985 | A1 * | 7/2015 | Feldman | H04L 67/36 |
| | | | | 715/753 |
| 2016/0018943 | A1 * | 1/2016 | Nara | G06F 3/1454 |
| | | | | 345/173 |
| 2017/0078740 | A1 * | 3/2017 | Iwami | G06F 3/1454 |

FOREIGN PATENT DOCUMENTS

| | | |
|---|---|---|
| CN | 103347162 A | 10/2013 |
| CN | 104065803 A | 9/2014 |
| JP | 2012-83940 A | 4/2012 |

* cited by examiner

VEHICLE-MOUNTED TERMINAL AND METHOD FOR OBTAINING RESOLUTION OF A SCREEN OF A HANDHELD TERMINAL

RELATED APPLICATIONS

This application claims all benefits accruing under 35 U.S.C. § 119 from China Patent Application No. 201410837698.2, filed on Dec. 29, 2014 in the China Intellectual Property Office, the contents of which are hereby incorporated by reference.

FIELD OF THE INVENTION

The present disclosure generally relates to the technical field of synchronous data transmission, and more particularly, to a vehicle-mounted terminal and a method for obtaining a resolution of a screen of a handheld terminal.

BACKGROUND OF THE INVENTION

Instantly, a display on a screen of a handheld terminal is too difficult to operate or inconvenient to operate, especially if the screen of the handheld terminal is too small. Mapping a display on the screen of the handheld terminal to a screen of another terminal with a larger screen, such as a vehicle-mounted terminal, could allow a user to operate the handheld terminal through the vehicle-mounted terminal. To achieve this, the resolution of the screen of the handheld terminal must be obtained before the vehicle-mounted terminal can reproduce the display on its screen to allow synchronous manipulation. Otherwise, it is very likely that a shift of the touch coordinates would occur during the process of synchronous manipulation, which would greatly affect the effect of the synchronous manipulation.

The resolution of the screen of the handheld terminal is often obtained by installing special software in the handheld terminal and using the special software to directly obtain the resolution of the screen of the handheld terminal. However, the special software adds to the cost and complexity of the handheld device.

SUMMARY OF THE INVENTION

In view of the above, one objective of the present invention is to provide a vehicle-mounted terminal and a method for obtaining a resolution of a screen of a handheld terminal.

According to a first aspect of the present invention, a method for obtaining a resolution of a terminal screen, which comprises the following steps of: establishing a connection between a handheld terminal having a second screen and a vehicle-mounted terminal having a first screen; mapping a display of the second screen onto the first screen; obtaining a first coordinate difference between two coordinate points on the second screen and a second coordinate difference between two mapped points on the first screen that correspond to the two coordinate points respectively; and obtaining a resolution of the second screen using the relationship that a ratio of the first coordinate difference to the second coordinate difference is equal to a ratio of the resolution of the second screen to a mapped resolution mapped by the resolution of the second screen onto the first screen, wherein the mapped resolution of the second screen mapped onto the first screen is a first resolution and the resolution of the second screen is a second resolution.

In one embodiment, the step of obtaining the first coordinate difference between the two coordinate points on the second screen is implemented by the vehicle-mounted terminal and comprises: transmitting a first cursor data to the handheld terminal to control a cursor displayed on the second screen to move to a vertex of the second screen; transmitting a second cursor data to the handheld terminal to control the cursor displayed on the second screen to move to a first coordinate point on the second screen; and obtaining the first coordinate difference between the first coordinate point and the vertex.

In one embodiment, the step of obtaining the first coordinate difference between the two coordinate points on the second screen further comprises: establishing a first rectangular plane coordinate system by taking the vertex of the second screen as an origin and two perpendicular sides of the second screen as two coordinate axes; transmitting a second cursor data to the handheld terminal to control a cursor displayed on the second screen to move by a first displacement $a_1$ along an abscissa axis of the first rectangular plane coordinate system and a second displacement $b_1$ along an ordinate axis of the first rectangular plane coordinate system to the first coordinate point; and obtaining the first coordinate difference $(a_1, b_1)$ between the first coordinate point and the vertex in the first rectangular plane coordinate system.

In one embodiment, the step of obtaining the second coordinate difference between the two mapped points on the first screen that correspond to the two coordinate points comprises: establishing a second rectangular plane coordinate system by taking a first mapped point of the vertex on the first screen as an origin and two perpendicular sides of the second screen mapped onto the first screen as two coordinate axes; obtaining coordinates $(a_2, b_2)$ of a second mapped point of the first coordinate point of the second screen on the first screen by detecting a position of the cursor clicked by a user on the first screen; and obtaining the second coordinate difference $(a_2, b_2)$ between the second mapped point and the first mapped point.

In one embodiment, the first resolution may be $(X_1, Y_1)$ and the second resolution may be $(X_2, Y_2)$, and the step of obtaining the second resolution using the relationship that a ratio of the first coordinate difference to the second coordinate difference is equal to a ratio of the second resolution to the first resolution is implemented by the vehicle-mounted terminal and comprises: obtaining the resolution $(X_2, Y_2)$ of the second screen of the handheld terminal by the vehicle-mounted terminal according to equations of $a_1/a_2=X_2/X_1$ and $b_1/b_2=Y_2/Y_1$.

In one embodiment, the method for obtaining a resolution of a terminal screen may further comprises the step of: transmitting multiple second cursor data, which is different for each time, to the handheld terminal for a plurality of times by the vehicle-mounted terminal, and taking an average value obtained by a number of calculations from the multiple second cursor data as the resolution of the second screen.

In one embodiment, the vehicle-mounted terminal establishes the connection with the handheld terminal according to a Bluetooth HID protocol.

According to a second aspect of the present invention, a vehicle-mounted terminal which comprises a first screen and a controlling and processing module. The controlling and processing module is configured to establish a connection with a handheld terminal to map a display of a second screen of the handheld terminal onto the first screen; obtain a first coordinate difference between two coordinate points on the second screen and a second coordinate difference between two mapped points on the first screen that correspond to the two coordinate points; and obtain a resolution of the second screen using the relationship that a ratio of the first coordinate difference to the second coordinate difference is equal to a ratio of the resolution of the second screen to a mapped resolution mapped by the resolution of the second screen onto the first screen, wherein the mapped resolution the second screen mapped onto the first screen is a first resolution and the resolution of the second screen is a second resolution.

In one embodiment, the vehicle-mounted terminal further comprises a data transmitting module, being configured to transmit a first cursor data to the handheld terminal under the control of the controlling and processing module so as to control a cursor displayed on the second screen to move to a vertex of the second screen, and transmit a second cursor data to the handheld terminal under the control of the controlling and processing module so as to control the cursor displayed on the second screen to move to a first coordinate point on the second screen.

In one embodiment, the controlling and processing module may further be configured to: establish a first rectangular plane coordinate system by taking the vertex of the second screen as an origin and two perpendicular sides of the second screen as two coordinate axes, control the data transmitting module to transmit the second cursor data to the handheld terminal so as to control a cursor displayed on the second screen to move by a first displacement $a_1$ along an abscissa axis of the first rectangular plane coordinate system and a second displacement $b_1$ along an ordinate axis of the first rectangular plane coordinate system to the first coordinate point $(a_1, b_1)$, and obtain the first coordinate difference $(a_1, b_1)$ between the first coordinate point and the vertex.

In one embodiment, the controlling and processing module may further be configured to: establish a second rectangular plane coordinate system by taking a first mapped point of the vertex on the first screen as an origin and two perpendicular sides of the second screen mapped onto the first screen as two coordinate axes, obtain coordinates $(a_2, b_2)$ of a second mapped point of the first coordinate point of the second screen on the first screen by detecting a position of the cursor clicked by a user on the first screen, and obtain the second coordinate difference $(a_2, b_2)$ between the second mapped point and the first mapped point.

In one embodiment, the resolution of the first screen may be $(X_1, Y_1)$ and the resolution of the second screen may be $(X_2, Y_2)$, and the controlling and processing module may be configured to obtain the resolution $(X_2, Y_2)$ of the second screen of the handheld terminal according to equations of $a_1/a_2=X_2/X_1$ and $b_1/b_2=Y_2/Y_1$.

In one embodiment, the data transmitting module may further be configured to: under the control of the controlling and processing module, transmit multiple second cursor data, which is different for each time, to the handheld terminal for a plurality of times, and take an average value obtained by a number of calculations from the multiple second cursor data as the resolution of the second screen.

In one embodiment, the handheld terminal comprises a handheld terminal, and the vehicle-mounted terminal establishes the connection with the handheld terminal according to a Bluetooth HID protocol.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Hereinbelow, technical solutions of embodiments of the present disclosure will be described clearly and completely with reference to the attached drawings. Obviously, embodiments described hereinbelow are only some of but not all of the embodiments of the present disclosure. All other embodiments that can be obtained without making any inventive efforts by those of ordinary skill in the art upon reviewing the embodiments of the present disclosure shall fall within the scope of the present disclosure.

Figure 1:
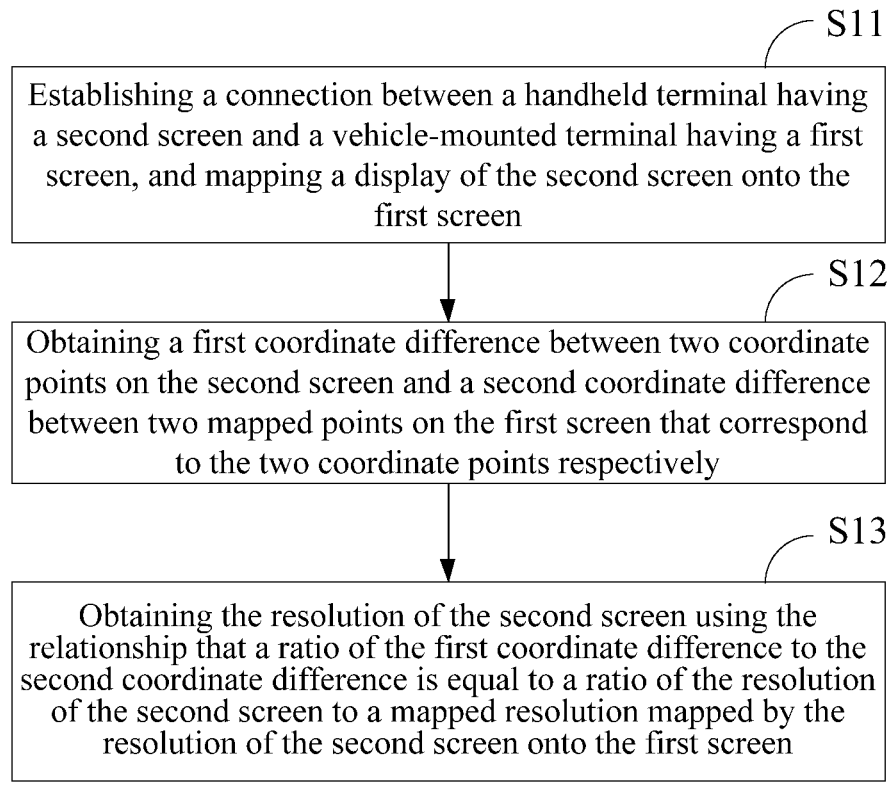
FIG. 1 is a flowchart diagram of a method for obtaining a resolution of a screen according to a first embodiment of the present disclosure.
Figure 2:
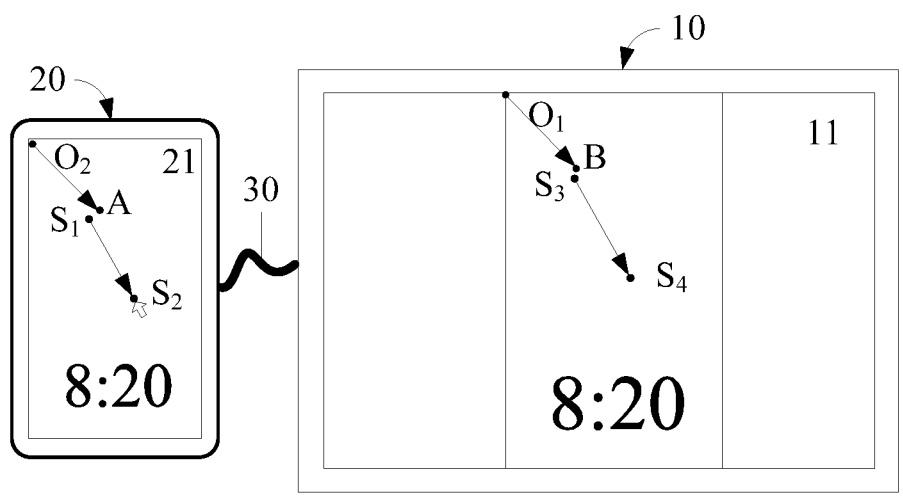
FIG. 2 is a schematic view of a first scenario in which a vehicle-mounted terminal is connected to a handheld terminal in the present disclosure.

Referring to FIGS. 1 and 2, a method of obtaining a resolution of a screen according to a first embodiment of the present disclosure is illustrated. The method of this embodiment comprises the following steps:

In a step S11, a connection is established between a handheld terminal (or a handheld terminal 20) and a vehicle-mounted terminal (or a vehicle-mounted terminal 10) to map a display of a second screen 21 of the handheld terminal 20 onto a first screen 11 of the vehicle-mounted terminal 10.

As shown in FIG. 2, the vehicle-mounted terminal 10 can establish the connection with the handheld terminal 20 by wireless means, such as a Bluetooth Human Interface Device (HID) protocol, or by wired means, such as a wired data line 30 connected between the vehicle-mounted terminal 10 and the handheld terminal 20. After the connection is established, the display of the second screen 21 could be mapped onto the first screen 11. The user can manipulate the display of the second screen 21 by operating on the display on the vehicle-mounted terminal 10, such as by touching the first screen 11.

If a second screen resolution $M_2$ of the second screen 21 is different from a first screen resolution $M_1$ of a mapped second screen on the first screen 11, the sizes of objects displayed on the second screen 21 and the first screen 11 can be different by a scale or proportion factor $\mu$. For example, as shown in FIG. 2, the object image "8:20" displayed on the second screen 21 is enlarged by the proportion factor $\mu$ before being mapped onto the first screen 11. The proportion factor $\mu$ can be equal to the ratio of the resolution $M_2$ of the second screen to the resolution $M_1$ of the first screen, i.e., $\mu=M_1/M_2$. The method can continue to step S12.

In a following step S12, the vehicle-mounted terminal 10 determines a first coordinate difference between two coordinate points on the second screen 21, and a second coordinate difference between two mapped points on the first screen 11, which correspond to the two coordinate points on the second screen 21. Then the method can proceed to step S13.

In step S13, the vehicle-mounted terminal 10 determines the resolution of the second screen 21 using the equation of a ratio of the first coordinate difference to the second coordinate difference equal to a ratio of the resolution of the second screen to a mapped resolution mapped by the resolution of the second screen onto the first screen.

For ease of description, hereinafter it is defined that a mapped resolution of a mapped second screen on the first screen 11 as a first resolution $M_1$, and the resolution of the second screen 21 as a second resolution $M_2$. The first resolution and the second resolution can be expressed as $M_1$ ($x_{1_{max}}$, $y_{1_{max}}$), $M_2$ ($x_{2_{max}}$, $y_{2_{max}}$) respectively hereinafter.

As shown in FIG. 2, two coordinate points $S_1$ ($x_1$, $y_1$), $S_2$ ($x_2$, $y_2$) on the second screen 21 are mapped to two coordinate points $S_3$ ($x_3$, $y_3$), $S_4$ ($x_4$, $y_4$) on the first screen 11, respectively. In this embodiment, when a cursor displayed on the second screen 21 moves from the coordinate point $S_1$ to the coordinate point $S_2$, the cursor moves a distance $d_1 = |x_2 - x_1|$ along a horizontal direction and a distance $d_2 = |y_2 - y_1|$ along a vertical direction. The first coordinate difference can be defined as the total distance between the coordinate point $S_1$ and the coordinate point $S_2$. Simultaneously, a cursor displayed on the first screen 11 moves from the coordinate point $S_3$ to the coordinate point $S_4$ by a distance $d_3 = |x_4 - x_3|$ along the horizontal direction and a distance $d_4 = |y_4 - y_3|$ along the vertical direction. The second coordinate difference can be defined as the total distance between the mapped point $S_3$ and the mapped point $S_4$.

The following equations 1-1 and 1-2 can be obtained according to the relation $\mu = M_1 / M_2$:

$$d_1/d_3 = x_{2_{max}}/x_{1_{max}} \qquad \text{Equation 1-1}$$

$$d_2/d_4 = y_{2_{max}}/y_{1_{max}} \qquad \text{Equation 1-2}$$

Equations 1-3 and 1-4 can be obtained through substitution:

$$|x_2 - x_1|/|x_4 - x_3| = x_{2_{max}}/x_{1_{max}} \qquad \text{Equation 1-3}$$

$$|y_2 - y_1|/|y_4 - y_3| = y_{2_{max}}/y_{1_{max}} \qquad \text{Equation 1-4}$$

The vehicle-mounted terminal 10 can obtain, through system operations thereof, the mapped resolution $M_1$ ($x_{1_{max}}$, $y_{1_{max}}$) of the mapped second screen on the first screen 11. Then the vehicle-mounted terminal 10 can calculate $x_{2_{max}}$ and $y_{2_{max}}$ according to the coordinate points $S_1$ ($x_1$, $y_1$), $S_2$ ($x_2$, $y_2$), $S_3$ ($x_3$, $y_3$), and $S_4$ ($x_4$, $y_4$), and equations 1-1 and 1-2 to obtain the resolution $M_2$ of the second screen 21.

Thus, the resolution of the second screen 21 can be obtained without the need of special software installed on the handheld terminal 20. Accordingly, the R&D (Research and Development) cost and installation of the special software can be avoided, so the vehicle-mounted terminal 10 can obtain the resolution of the second screen 21 of the handheld terminal 20 at a low cost and with simple operations, thus providing good user experience.

Figure 3:
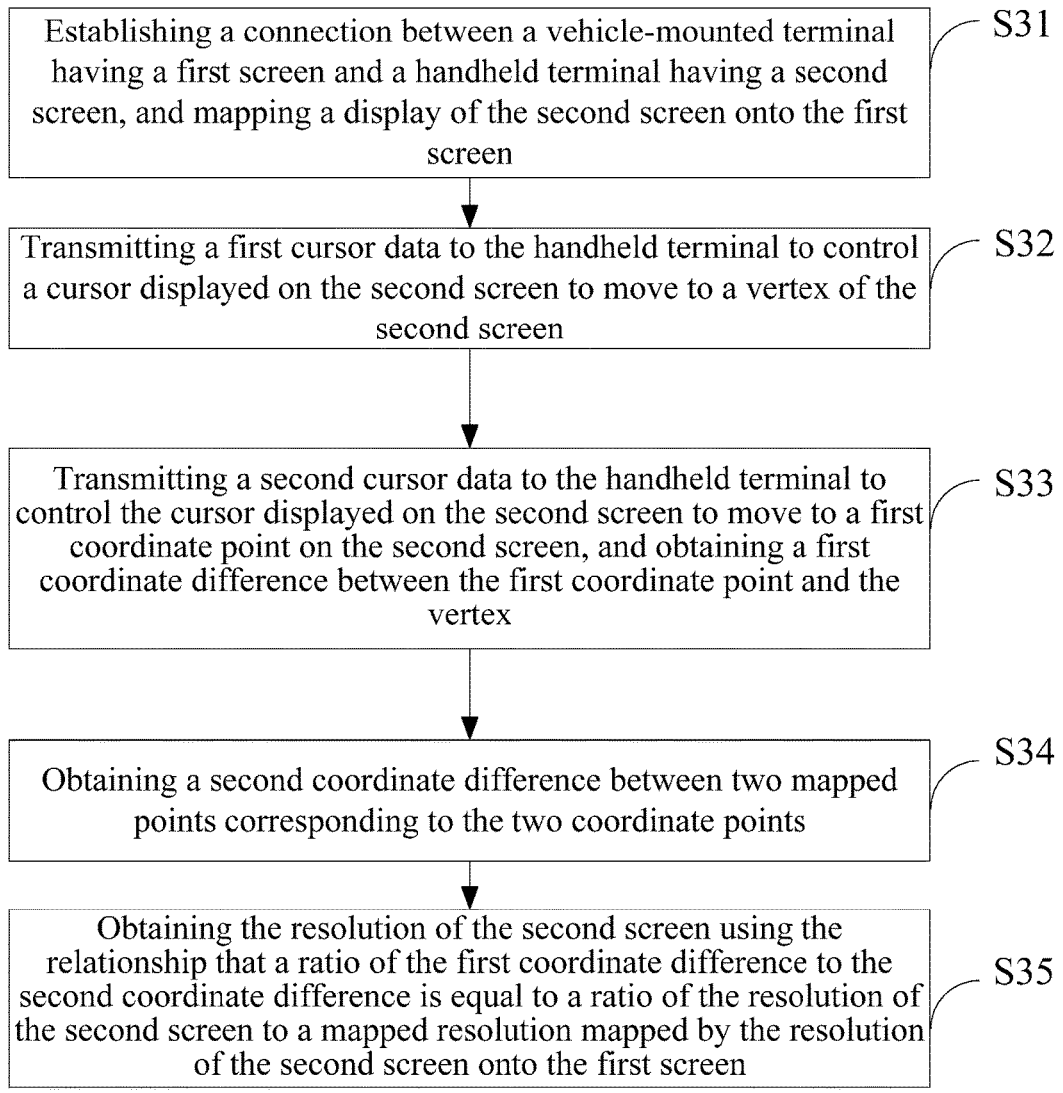
FIG. 3 is a flowchart diagram of a method for obtaining a resolution of a screen according to a second embodiment of the present disclosure.

The first coordinate difference between the two coordinate points on the second screen in the step S12 may be achieved by selecting a vertex on the second screen as one of the two coordinate points. Referring now to FIG. 3, a method for obtaining a resolution of a second screen according to an aspect of the present disclosure can include the following steps.

In a first step S31, a connection between a handheld terminal 20 and a vehicle-mounted terminal 10 can be established to map a display of a second screen 21 of the handheld terminal 20 onto a first screen 11 of the vehicle-mounted terminal 10.

In the following step S32, a first cursor data can be sent to the handheld terminal 20 from the vehicle-mounted terminal 10 to move a cursor displayed on the second screen 21 to a vertex of the second screen 21.

The first cursor data can be configured to move a cursor on the second screen 21 m units along the horizontal direction and n units along the vertical direction, in which m is greater than $y_{2_{max}}$, n is greater than $x_{2_{max}}$, and the value of m may be the same or different from the value of n. One unit can represent one pixel of the second screen 21. For example, if the cursor moves 32768 units along the horizontal direction and 32768 units along the vertical direction, because the cursor cannot go beyond the boundary of the second screen 21, the cursor would be still located at a vertex $O_2$ of the second screen 21 after moving.

Simultaneously, the cursor on the first screen 11 moves m' units corresponding to m units on the second screen 21 along the horizontal direction and n' units corresponding to n units on the second screen 21 along the vertical direction, in which m' is greater than $y_{1_{max}}$ and n' is greater than $x_{1_{max}}$. Because the cursor will not go beyond the boundary of the display mapped by the second screen 21 onto the first screen 11, the cursor would be still located at a vertex $O_1$ of the display mapped onto the first screen 11 after moving. Then the method can continue to step S33.

In step S33, a second cursor data is sent to the handheld terminal 20 from the vehicle-mounted terminal 10 to move the cursor displayed on the second screen 21 to a first coordinate point on the second screen 21, so as to obtain the first coordinate difference between the first coordinate point and the vertex.

As shown in FIG. 2, in an embodiment of this invention, a first rectangular plane coordinate system can be established by taking the vertex $O_2$ of the second screen 21 as the origin and two perpendicular sides of the second screen 21 as two coordinate axes. Wherein a shorter side of the two perpendicular sides can be an abscissa axis and a longer side of the two perpendicular sides can be an ordinate axis.

The second cursor data can be utilized to control the cursor displayed on the second screen 21 to move a first displacement $a_1$ along the abscissa axis of the first rectangular plane coordinate system and a second displacement $b_1$ along the ordinate axis of the first rectangular plane coordinate system to a first coordinate point A ($a_1$, $b_1$). The first coordinate difference between the first coordinate point A ($a_1$, $b_1$) and the vertex $O_2$ can be obtained according to the coordinates (0,0) of the vertex $O_2$ and the coordinates ($a_1$, $b_1$) of the first coordinate point A in the first rectangular plane coordinate system. For example, if the second cursor data is configured to control the cursor displayed on the second screen 21 to move 100 units along the positive x-axis direction and 200 units along the negative y-axis direction, the first coordinate point A would be (100, 200) and the first coordinate difference between the first coordinate point A and the vertex $O_2$ would be (100, 200). Simultaneously, the cursor on the first screen 11 moves to a second coordinate point B. The process can continue to step S34.

In step S34, the vehicle-mounted terminal 10 can determine a second coordinate difference between two mapped points on the first screen 11 that correspond to the two coordinate points on the second screen 21.

The vertex $O_1$ can be the first mapped point of the vertex $O_2$, and the second coordinate point B can be the second mapped point of the first coordinate point A.

Still referring to FIG. 2, a second rectangular plane coordinate system can be established by taking the first mapped point $O_1$ as an origin and two perpendicular sides of the mapped second screen on the first screen 11 as two coordinate axes. The two shorter sides of the second screen 21 are mapped to partly overlap the two longer sides of the first screen 11, and the two longer sides of the second screen 21 are mapped to be parallel to and spaced apart from the two shorter sides of the first screen 11.

In this example, the vehicle-mounted terminal 10 can obtain coordinates ($a_2$, $b_2$) of the second mapped point B by detecting the position of the cursor clicked or selected by the user on the first screen 11. The second coordinate difference ($a_2$, $b_2$) between the second mapped point B and the first mapped point $O_1$ can be obtained from the coordinates (0,0) of the first mapped point $O_1$ and the coordinates ($a_2$, $b_2$) of the second mapped point B on the second rectangular plane coordinate system. Then the process can continue to step S35.

In step S35, the resolution of the second screen 21 can be obtained by the vehicle-mounted terminal 10 using the relationship that a ratio of the first coordinate difference to the second coordinate difference is equal to a ratio of the resolution of the second screen to the mapped resolution mapped by the resolution of the second screen on the first screen.

In this embodiment, the vertex $O_2$ (0,0) can correspond to the coordinate point $S_1$ ($x_1$, $y_1$), the first coordinate point A ($a_1$, $b_1$) can correspond to the coordinate point $S_2$ ($x_2$, $y_2$), the first mapped point $O_1$ (0,0) can correspond to the mapped point $S_3$ ($x_3$, $y_3$), and the second mapped point B ($a_2$, $b_2$) can correspond to the mapped point $S_4$ ($x_4$, $y_4$). In addition, the mapped resolution ($X_1$, $Y_1$) of a mapped second screen on the first screen 11 can correspond to the first resolution $M_1$ ($x_{1_{max}}$, $y_{1_{max}}$), and the resolution ($X_2$, $Y_2$) of the second screen 21 can correspond to the second resolution $M_2$ ($x_{2_{max}}$, $y_{2_{max}}$).

The following equations 2-1 and 2-2 can be obtained according to the equations 1-3 and 1-4 previously described.

$$a_1/a_2 = X_2/X_1 \qquad \text{Equation 2-1}$$

$$b_1/b_2 = Y_2/Y_1 \qquad \text{Equation 2-1}$$

Because the vehicle-mounted terminal 10 has already obtained the resolution ($X_1$, $Y_1$) of the first screen 11 and the coordinates ($a_2$, $b_2$) of the second mapped point B, the vehicle-mounted terminal 10 can calculate the second resolution $X_2$ and $Y_2$ to obtain the resolution of the second screen 21 according to the equations 2-1 and 2-2. As shown, the vertices $O_1$ and $O_2$ are located at the upper left corner of the screen. However, in other examples, the vertices $O_1$ and $O_2$ may be located at other corners of the screen. According to the explanation of this embodiment, it is will be appreciated that, by those skilled in the art, how to calculate the first coordinate difference and the second coordinate difference to obtain the resolution of the second screen when the vertices are located at other positions, and thus will not be further described herein.

Figure 4:
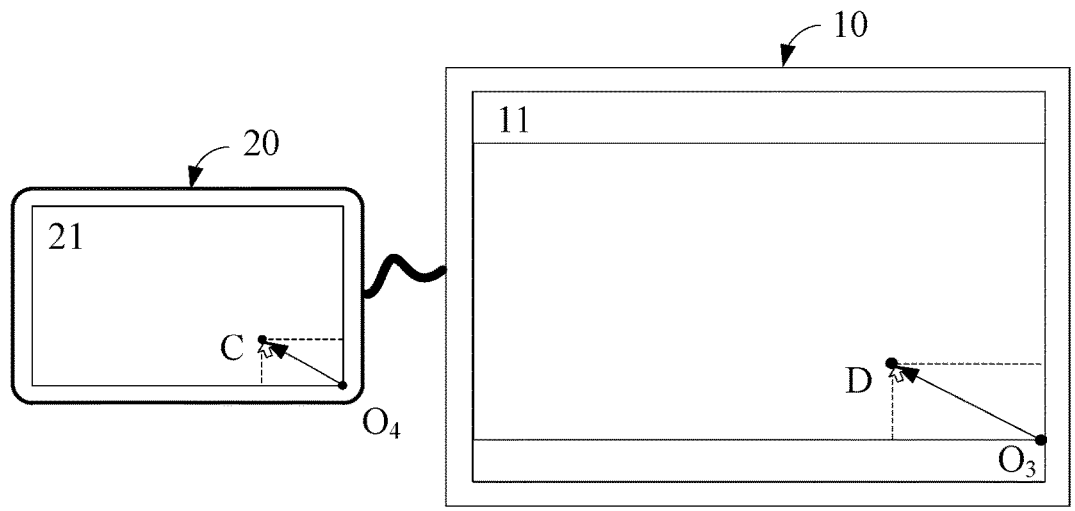
FIG. 4 is a schematic view of a second scenario in which a vehicle-mounted terminal is connected to a handheld terminal in the present disclosure.

Referring now to FIG. 4, the embodiment shown is substantially similar to the embodiment shown in FIG. 2, except that the second screen 21 of the handheld terminal 20 is mapped onto the first screen 11 of the vehicle-mounted terminal 10 in a landscape mode.

As shown in FIG. 4, the second screen 21 of the handheld terminal 20 is mapped onto the first screen 11 of the vehicle-mounted terminal 10 in a landscape mode. The shorter sides of the second screen 21 are mapped on the shorter sides of the first screen 11, and the longer sides of the second screen 21 are mapped being parallel to and spaced apart from the longer sides of the first screen 11. A first rectangular plane coordinate system is established by taking a vertex $O_4$ of the second screen 21 as an origin and two perpendicular sides of the second screen 21 as two coordinate axes, in which a longer side can be an abscissa axis and a shorter side can be an ordinate axis. A second rectangular plane coordinate system can be established by taking a vertex $O_3$ of the first screen 11 as an origin and two perpendicular sides of the second screen 21 mapped onto the first screen 11 as two coordinate axes.

The first cursor data is utilized to control a cursor on the second screen 21 to move m units along the positive x-axis direction and n units along the negative y-axis direction to the vertex $O_4$ of the second screen 21. Synchronously, the cursor on the first screen 11 moves to the vertex $O_3$ of the first screen 11.

The second cursor data is utilized to control a cursor displayed on the second screen 21 to move by a first displacement $a_1$ along the abscissa axis of the first rectangular plane coordinate system and a second displacement $b_1$ along the ordinate axis of the first rectangular plane coordinate system to a first coordinate point C ($a_1$, $b_1$). The first coordinate difference ($a_1$, $b_1$) between the first coordinate point C and the vertex $O_4$ can be obtained according to the coordinates (0,0) of the vertex $O_4$ and the coordinates ($a_1$, $b_1$) of the first coordinate point C in the first rectangular plane coordinate system. Synchronously, the cursor on the first screen 11 moves to a second coordinate point D of the first screen 11.

The vertex $O_3$ can be the first mapped point of the vertex $O_4$, and the second coordinate point D can be the second mapped point of the first coordinate point C. The vehicle-mounted terminal 10 can obtain coordinates ($a_2$, $b_2$) of the second mapped point D by detecting the position of the cursor clicked or selected by the user on the first screen 11.

Similarly, the vehicle-mounted terminal 10 can calculate the second resolution $X_2$ and $Y_2$ to obtain the resolution of the second screen according to the equations 2-1 and 2-2. As shown, the vertices $O_3$ and $O_4$ are located at the lower right corner of the screen. However, the vertices $O_3$ and $O_4$ may be located at other corners of the screen. According to the explanation of this embodiment, it will be appreciated, by those skilled in the art, how to calculate the first coordinate difference and the second coordinate difference so as to obtain the resolution of the second screen when the vertices are located at other positions, and thus will not be further described herein.

In the embodiments shown in FIG. 2 and FIG. 4, the coordinates ($a_2$, $b_2$) of the second mapped point can only be obtained by the vehicle-mounted terminal 10 through detecting the position of the cursor clicked by a user on the first screen 11, which may cause deviation. Accordingly, in this embodiment, the vehicle-mounted terminal 10 preferably transmits multiple different second cursor data to the handheld terminal 20 in multiple times. For example, the vehicle-mounted terminal 10 executes the steps S33~S35 repeatedly, and takes an average value as the resolution of the second screen 21. In this way, error of the resolution of the screen can be reduced and the accuracy can be improved.

In the embodiments of the present disclosure, the vehicle-mounted terminal 10 and the handheld terminal 20 mentioned context respectively take a vehicle-mounted terminal and an intelligent mobile phone as examples. However, the present disclosure is not limited thereto, and any other terminals with a screen and the synchronous manipulating function, e.g., a notebook computer, a portable communication device, a slide player, and a PDA (Personal Digital Assistant), etc., can also be the handheld terminal 20.

There are several different standards of the resolution of the screen of handheld terminals currently available on the market, e.g., 854*480, 960*540, 1280*720 and 1920*1080. Thus, in some embodiments of the present disclosure, the cursor on a screen of the handheld terminal, whatever is in the portrait mode shown in FIG. 2 or the landscape mode shown in FIG. 4, can be fixed to a calibration point in advance. Then the correspondence relationship between the resolution of the screen corresponding to the calibration point and the coordinates of the mapped point of the calibration point mapped on the screen of the vehicle-mounted terminal would be stored, e.g., in a table.

For example, the relationship between the calibration point (100, 100), the resolution of the screen of the handheld terminal and the coordinates of the mapped point of the calibration point (100, 100) mapped on the screen of the vehicle-mounted terminal can be obtained in a testing procedure before development, and as shown in the following table:

| Resolution of the Screen of the handheld terminal | Coordinates of the Mapped Point (Landscape Mode) | Coordinates of the Mapped Point (Portrait Mode) |
| --- | --- | --- |
| 854*480 | (94, 100) | (321, 56) |
| 960*540 | (83, 89) | (315, 50) |
| 1280*720 | (63, 67) | (303, 38) |
| 1920*1080 | (42, 44) | (290, 25) |

After the mapping connection between the handheld terminal and the vehicle-mounted terminal is established, the first cursor data controls the cursor on the screen of the intelligent mobile phone to move to the calibration point (100, 100).

Then a prompt message would be displayed on the screen of the vehicle-mounted terminal in a dialog box to request the user to click the position of the cursor on the screen, such as the position of the mapped point of the calibration point on the screen. After the position of the cursor is selected or clicked, the vehicle-mounted terminal obtains the coordinates (X, Y) of the cursor selected by the user on the screen of the vehicle-mounted terminal.

The resolution of the handheld terminal is determined by selecting a set of values that are closest to the coordinates (X, Y) of the selected or clicked cursor or point. For example, if the coordinates of the selected point is (300, 40), a point having coordinates (303, 38) which is closest to the coordinates (300, 40) in the table can be selected as the mapped point, and the resolution of the handheld terminal can be determined as 1280*720. The above process can be repeated for several different calibration points to obtain a more accurate result.

Figure 5:
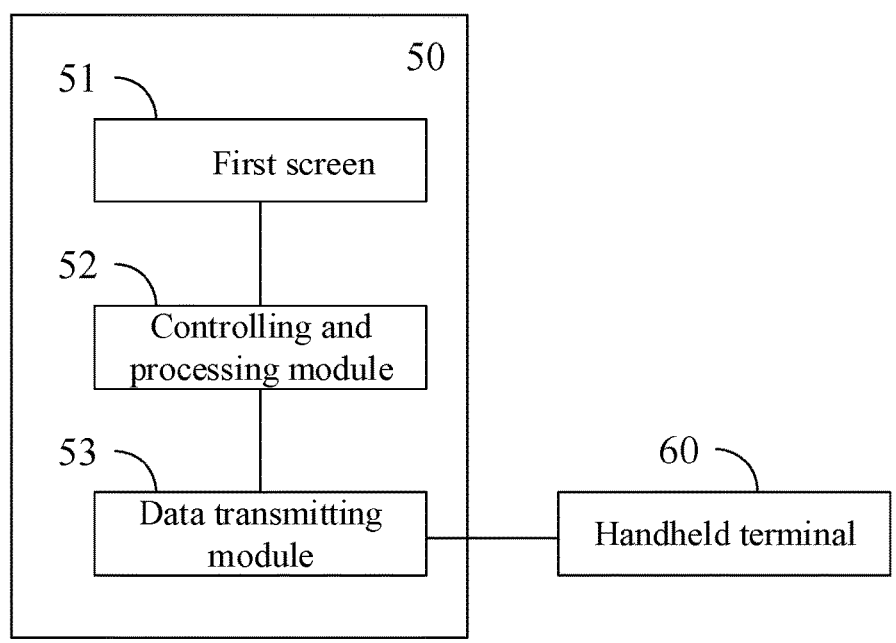
FIG. 5 is a block diagram illustrating a vehicle-mounted terminal according to the first embodiment of the present disclosure.

Referring now to FIG. 5, FIG. 5 is a block diagram illustrating principles of a vehicle-mounted terminal according to an embodiment of the present disclosure. As shown in FIG. 5, a vehicle-mounted terminal 50 can establish the connection with a handheld terminal 60 by a Bluetooth HID protocol. After the connection is established, a display of a second screen of the handheld terminal 60 is mapped onto a first screen 51 of the vehicle-mounted terminal 50. The user can synchronously operate the display on the second screen of the handheld terminal 60 by operating on the first screen 51 of the vehicle-mounted terminal 50, such as by touching the first screen 51.

The vehicle-mounted terminal 50 can further comprise a controlling and processing module 52, which is configured to establish a connection with the handheld terminal 60 to map the display of the second screen of the handheld terminal 60 onto the first screen 51. The controlling and processing module 52 can obtain a first coordinate difference between two coordinate points, which are corresponding to the two coordinate points respectively, on the second screen and a second coordinate difference between two mapped points on the first screen 51.

The controlling and processing module 52 can further determine the resolution of the second screen according to the relationship of a ratio of the first coordinate difference to the second coordinate difference is equal to a ratio of the resolution of the second screen 52 to a mapped resolution mapped by the resolution of the second screen onto the first screen 51. The mapped resolution can be defined as a first resolution and the resolution of the second screen as a second resolution.

In one embodiment, the vehicle-mounted terminal 50 can further include a data transmitting module 53, which is configured to transmit a first cursor data to the handheld terminal 60 under the control of the controlling and processing module 52 to control a cursor displayed on the second screen to move to a vertex of the second screen. The data transmitting module 53 can also transmit a second cursor data to the handheld terminal 60 under the control of the controlling and processing module 52 to control the cursor displayed on the second screen to move to a first coordinate point on the second screen.

The controlling and processing module 52 is further configured to establish a first rectangular plane coordinate system by taking the vertex of the second screen as an origin and two perpendicular sides of the second screen as an abscissa axis and an ordinate axis. The controlling and processing module 52 can further control the data transmitting module 53 to transmit the second cursor data to the handheld terminal 60, so as to control a cursor displayed on the second screen to move by a first displacement $a_1$ along the abscissa axis and a second displacement $b_1$ along the ordinate axis to a first coordinate point ($a_1$, $b_1$). Then the controlling and processing module 52 can further obtain the first coordinate difference between the first coordinate point ($a_1$, $b_1$) and the vertex.

The controlling and processing module 52 is further configured to establish a second rectangular plane coordinate system by taking a first mapped point of the vertex on the first screen 51 as an origin and two perpendicular sides of the second screen mapped onto the first screen 51 as two coordinate axes. Then the controlling and processing module 52 can further obtain the coordinates ($a_2$, $b_2$) of a second mapped point of the first coordinate point on the first screen 51 by detecting the position of the cursor clicked by the user on the first screen 51. Based on the coordinates (0,0) of the first mapped point and the coordinates ($a_2$, $b_2$) of the second mapped point on the second rectangular plane coordinate system, the controlling and processing module 52 can further be configured to obtain the second coordinate difference ($a_2$, $b_2$) between the second mapped point and the first mapped point.

The mapped resolution of the mapped second screen on the first screen 51 can be defined as ($X_1$, $Y_1$) and the resolution of the second screen as ($X_2$, $Y_2$). The controlling and processing module 52 can obtain the resolution ($X_2$, $Y_2$) of the second screen of the handheld terminal 60 using the equations: $a_1/a_2 = X_2/X_1$ and $b_1/b_2 = Y_2/Y_1$.

The data transmitting module 53 is further configured to, under the control of the controlling and processing module 52, transmit multiple different second cursor data to the handheld terminal 60 in multiple times. The controlling and processing module 52 is configured to take an average value obtained from the total number of resolution calculations as the resolution of the second screen.

In this embodiment, the first screen 51, the controlling and processing module 52 and the data transmitting module 53 of the vehicle-mounted terminal 50 together with the handheld terminal 60 correspondingly execute the method for obtaining a resolution of a screen described in the aforesaid embodiments and can achieve the same technical effect as the aforesaid embodiments.

It shall be appreciated that the implementation of the vehicle-mounted terminal 50 described above is only for illustrative. For example, several modules may be combined or integrated into one single module in other systems, or some features may be ignored. Furthermore, the coupling or the communication connection between the modules may be achieved via some interfaces, electrical connection mode or in other forms.

As the components of the vehicle-mounted terminal 50, the aforesaid functional modules may be or may not be physical blocks, may be located together at one position or distributed onto several network units, and may be achieved by software functional blocks or by hardware. Those skilled in the art may select some or all of the modules to achieve the objective of the present disclosure depending on practical needs.

Figure 6:
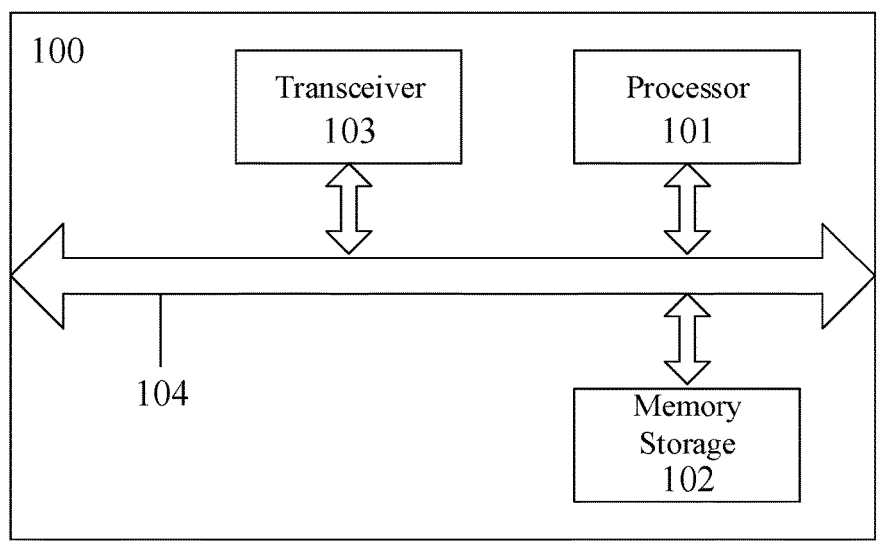
FIG. 6 is a schematic structural view of a vehicle-mounted terminal according to the second embodiment of the present disclosure.

Referring now to FIG. 6, FIG. 6 is a schematic structural view of a vehicle-mounted terminal according to the second embodiment of the present disclosure. As shown in FIG. 6, a vehicle-mounted terminal 100 comprises a screen (not shown), a processor 101, a memory storage 102, a transceiver 103, and a bus 104. The processor 101, the memory storage 102 and the transceiver 103 are connected to the screen via the bus 104. The transceiver 103 is configured to establish data communication between the vehicle-mounted terminal 100 and a handheld terminal.

The memory storage 102 may be implemented as a floppy disk of a computer, a USB flash disk, a hard drive, a ROM (Read-Only Memory), a RAM (Random Access Memory), a magnetic disk, an optical disk, or any other memory storage device.

The storage 102 is stored with a program or instructions for obtaining the resolution of the screen of the handheld terminal. The processor 101 executes the application program or instructions stored in the storage 102, and controls the transceiver 103 to receive and transmit data with a handheld terminal so as to map a display of a screen of the handheld terminal onto the screen of the vehicle-mounted terminal 100.

The processor 101 is further configured to obtain a first coordinate difference between two coordinate points on the screen of the handheld terminal and a second coordinate difference between two mapped points on the screen of the vehicle-mounted terminal 100 corresponding to the two coordinate points.

The processor 101 may also obtain the resolution of the screen of the handheld terminal from the relationship of a ratio of the first coordinate difference to the second coordinate difference is equal to a ratio of the resolution of the screen of the handheld terminal to a mapped resolution of the mapped second screen on the vehicle-mounted terminal 100. The mapped resolution of the vehicle-mounted terminal 100 can be defined as a first resolution, and the resolution of the screen of the handheld terminal can be defined as a second resolution.

The processor 101 may also instruct the transceiver 103 to transmit a first cursor data to the handheld terminal to move a cursor displayed on the screen of the handheld terminal to a vertex of the screen of the handheld terminal. The processor 101 may also instruct the transceiver 103 to transmit a second cursor data to the handheld terminal to move the cursor displayed on the screen of the handheld terminal to a first coordinate point on the screen of the handheld terminal.

The processor 101 may also establish a first rectangular plane coordinate system by taking the vertex of the screen of the vehicle-mounted terminal 100 as an origin and two perpendicular sides of the screen of the vehicle-mounted terminal 100 as two coordinate axes. The processor 101 may also control the transceiver 103 to transmit the second cursor data to the handheld terminal, so as to move a cursor displayed on the screen of the handheld terminal a first displacement $a_1$ along an abscissa and a second displacement $b_1$ along an ordinate axis to a first coordinate point ($a_1$, $b_1$). Then the processor 101 may obtain the first coordinate difference between the first coordinate point and the vertex.

The processor 101 may also establish a second rectangular plane coordinate system by taking a first mapped point of the vertex on the screen of the vehicle-mounted terminal 100 as an origin and two perpendicular sides mapped onto the screen of the vehicle-mounted terminal 100 as two coordinate axes. And the processor 101 may also obtain the coordinates ($a_2$, $b_2$) of a second mapped point on the screen of the vehicle-mounted terminal 100 by detecting the position of the cursor clicked on displayed by the user on the screen of the vehicle-mounted terminal 100. The second mapped point is a mapped point of the first coordinate point on the screen of the handheld terminal. Then the processor 101 may obtain the second coordinate difference between the second mapped point and the first mapped point.

The resolution of the screen of the vehicle-mounted terminal 100 can be ($X_1$, $Y_1$) and the resolution of the screen of the handheld terminal can be ($X_2$, $Y_2$). The processor 101 may obtain the resolution ($X_2$, $Y_2$) of the screen of the handheld terminal according to equations: $a_1/a_2 = X_2/X_1$ and $b_1/b_2 = Y_2/Y_1$.

The processor 101 may also instruct the transceiver 103 to transmit the second cursor data a number of times. The processor 101 may then take an average value from the total number of resolution calculations as the resolution of the screen of the handheld terminal.

In this embodiment, the screen, the processor 101 and the transceiver 103 of the vehicle-mounted terminal 100 together with the handheld terminal correspondingly execute the method for obtaining resolution of a screen described in the aforesaid embodiments and can achieve the same technical effect as the aforesaid embodiments.

It shall be noted that, the directional terms (e.g., "upper", "lower", etc.) described throughout the embodiments of the present disclosure are described only for purpose of illustration with reference to the direction of the attached drawings, and are not intended to limit the present disclosure.

It shall also be noted that, what described above are only the embodiments of the present disclosure, but are not intended to limit the scope of the present disclosure. Any equivalent structures or equivalent process flow modifications (e.g., combinations of technical features described in various embodiments) that are made according to the specification and the attached drawings of the present disclosure, or any direct or indirect applications of the present disclosure in other related technical fields shall all be covered within the scope of the present disclosure.

What is claimed is:

1. A vehicle-mounted terminal, comprising a screen, a processor, a memory, a transceiver and a bus, wherein:

the processor, the memory and the transceiver are connected to the screen via the bus;

the transceiver is configured to establish a connection with a handheld terminal;

the memory is stored with program instructions;

the processor is configured to execute the program instructions to:

map a display of a screen of the handheld terminal onto the screen of the vehicle-mounted terminal;

obtain a first coordinate difference between two coordinate points on the screen of the handheld terminal and a second coordinate difference between two mapped points on the screen of the vehicle-mounted terminal, wherein the two mapped points on the screen of the vehicle-mounted terminal correspond to the two coordinate points on the screen of the handheld terminal; and obtain a resolution of the screen of the handheld terminal based on the first coordinate difference, the second coordinate difference and a mapped resolution of the screen of the vehicle-mounted terminal by using an equation that a ratio of the first coordinate difference to the second coordinate difference is equal to a ratio of the resolution of the screen of the handheld terminal to the mapped resolution of the screen of the vehicle-mounted terminal.

2. The vehicle-mounted terminal of claim 1, wherein for obtaining the first coordinate difference between two coordinate points on the screen of the handheld terminal and the second coordinate difference between two mapped points on the screen of the vehicle-mounted terminal, the processor is configured to execute the program instructions to:

send a cursor data to the handheld terminal so as to move a first cursor displayed on the screen of the handheld terminal from an origin of a coordinate system of the screen of the handheld terminal to a given coordinate point, and acquire a coordinate of the given coordinate point;

determine the first coordinate difference between the given coordinate point and the origin in the coordinate system of the screen of the handheld terminal;

acquire a coordinate of a mapped coordinate point on the screen of the vehicle-mounted terminal which corresponds to the given coordinate point on the screen of the handheld terminal; and determine the second coordinate difference between the mapped coordinate point and an mapped origin of a coordinate system of the screen of the vehicle-mounted terminal in the coordinate system of the screen of the vehicle-mounted terminal.

3. The vehicle-mounted terminal of claim 2, wherein for acquiring the coordinate of the mapped coordinate point on the screen of the vehicle-mounted terminal, the processor is configured to execute the program instructions to:

detect position of a mapped cursor clicked by a user on the screen of the vehicle-mounted terminal; and take the position of the mapped cursor clicked by the user as the coordinate of the mapped coordinate point.

4. The vehicle-mounted terminal of claim 2, wherein the resolution of the screen of the handheld terminal is obtained by using the equation of:

$$X2 = X1 * a1/a2$$

$$Y2 = Y1 * b1/b2$$

where (X2, Y2) is the resolution of the screen of the handheld terminal;

(X1, Y1) is the mapped resolution of the screen of the vehicle-mounted terminal;

(a1, b1) is the first coordinate difference between the given coordinate point and the origin in the coordinate system of the screen of the handheld terminal; and (a2, b2) is the second coordinate difference between the mapped coordinate point and the mapped origin of a coordinate system of the screen of the vehicle-mounted terminal in the coordinate system of the screen of the vehicle-mounted terminal.

* * * * *